E. D. PRATT.
DOUBLE CHECK MACHINE FOR USE IN FOOD SERVICE.
APPLICATION FILED OCT. 15, 1917. RENEWED AUG. 27, 1919.

1,318,918.

Patented Oct. 14, 1919.
2 SHEETS—SHEET 1.

Witness
Fenton S. Belt
A. L. Huey

Inventor
Edwin D. Pratt
By Franklin W. Huey
Attorney

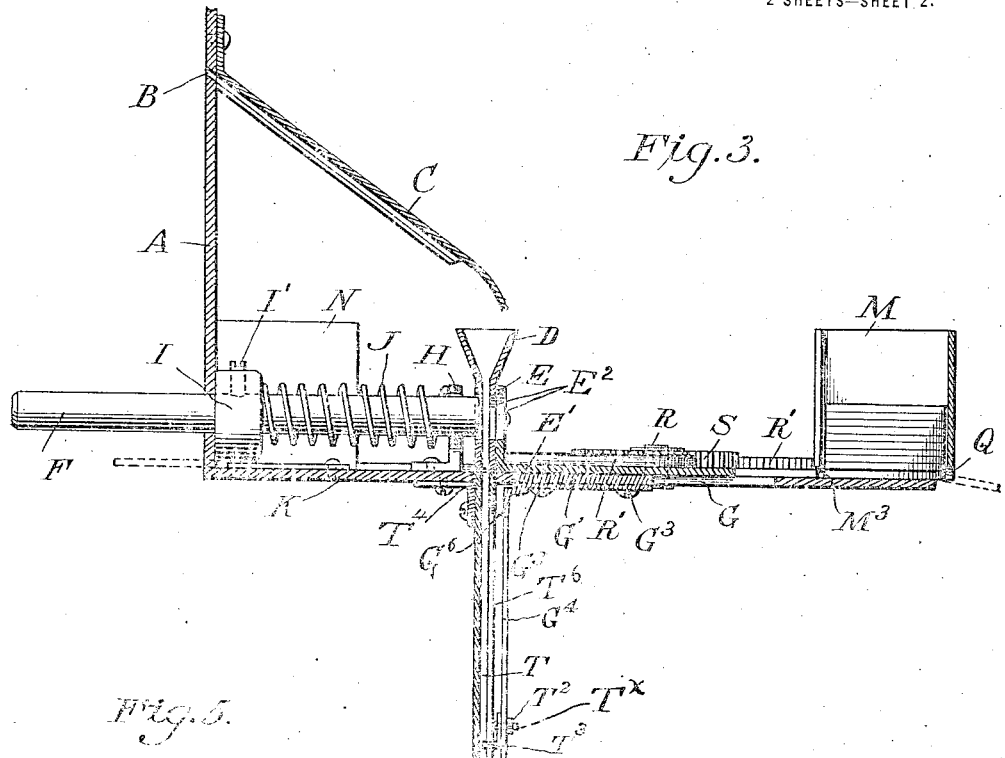
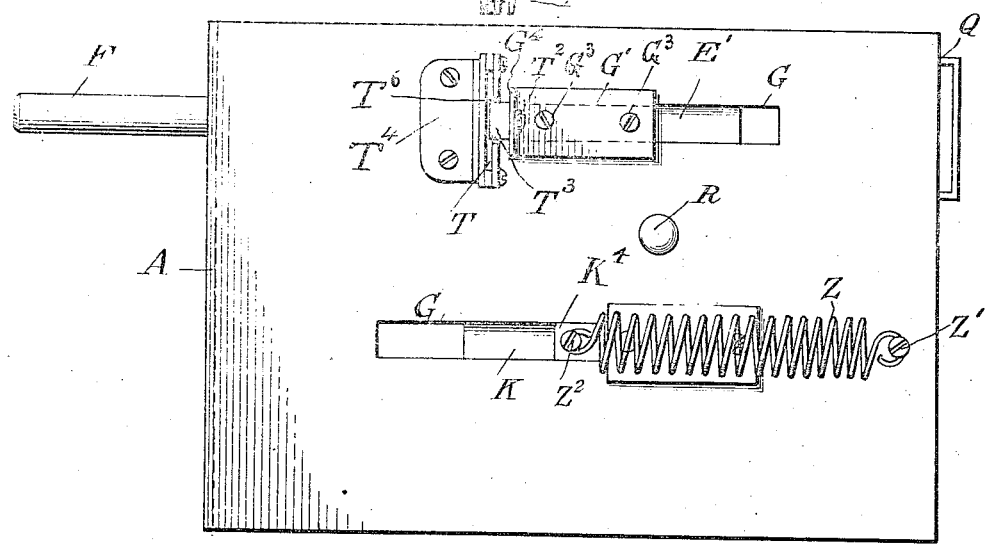

UNITED STATES PATENT OFFICE.

EDWIN D. PRATT, OF NEW YORK, N. Y.

DOUBLE-CHECK MACHINE FOR USE IN FOOD SERVICE.

1,318,918.   Specification of Letters Patent.   Patented Oct. 14, 1919.

Application filed October 15, 1917, Serial No. 196,773. Renewed August 27, 1919. Serial No. 320,310.

*To all whom it may concern:*

Be it known that I, EDWIN D. PRATT, a citizen of the United States, residing at New York, in the county of Manhattan and State of New York, have invented certain new and useful Improvements in Double-Check Machines for Use in Food Service; and do hereby declare the following to be a full, clear, and exact description of the invention, such as will enable other skilled in the art to which it appertains to make and use the same, reference being had to the accompanying drawings, and to the letters and figures of reference marked thereon, which form a part of this specification.

This invention relates to new and useful improvements in a double check food service system, the object in view being to produce an apparatus in which duplicate checks are delivered, one to a prospective purchaser and the other to a chef, the apparatus being operative after a coin or coins, to cover the amount of the purchase, have been deposited in the machine, and which coins coöperate with means causing duplicate checks to be delivered.

The present invention comprises a duplicate check system in which the purchaser, having made a selection of food, inserts a coin or coins representing the amount of the purchase, into a chute and which coin or coins coöperate with a push rod causing the undermost checks of duplicate series to be delivered, one to the chef and the other to the prospective purchaser, and when the order has been filled it is delivered into a compartment, access to which may be had by the purchaser dropping in his check when notified by the chef through the medium of suitable annunciator mechanism.

The invention consists further in the provision of various details of construction, combinations and arrangements of parts, which will be hereinafter fully described, shown in the accompanying drawings and then defined specifically in the appended claims.

I illustrate my invention in the accompanying drawings which with the letters of reference marked thereon, form a part of this specification and in which:

Fig. 3 is a central sectional view on line 3—3 of Fig. 2.

Fig. 5 is a bottom plan view.

Reference now being had to the details of the drawings by letters:

A designates a casing having a wall with a coin slot B therein, from which leads a coin chute C having an exit end directly over the upper flaring top of the hopper D, which is fastened to the upturned portion E of the slide E'. The walls of said hopper beneath its upper flaring end, and also the end E of the slide, are provided with registering apertures $E^2$ for the reception of the push rod F, which is mounted in registering apertures in the vertical wall of the casing A and in the guide bracket H fastened to the bottom of the casing. A collar I is fastened by a set screw I' to said rod, and J designates a coiled spring interposed between the guide bracket and said collar and serves to normally return the rod to its outer limit after having been pushed inward in the act of operating the double check delivery mechanism.

Mounted upon the bottom of the casing are stacks N and M, the inner faces of which are recessed, as at N' and $M^3$, respectively, to receive the two forked ends of the two slides K and E'. An exit slot O is formed in the bottom of the stack N and a similar exit slot Q is formed in the bottom of the stack M. Midway between the two slots is mounted a stationary post R, upon which a pinion wheel S is journaled, and upon the upper surface of each shank portion of the slides are rack teeth R', which are in engagement with the teeth of the pinion wheel. The bottom of the casing is provided with elongated slots G, and G' designates a plate, movable within one of said slots, which has flanges bearing against the under surface of the casing and which are held to the plate E' through the medium of the screws $G^3$. Said plate G' as shown clearly in Fig. 3 of the drawings, has a downwardly projecting portion $G^6$, having an elongated slot $G^4$ therein, and $T^3$ is an L-shaped member, from which a bolt $T^x$ projects through the slot $G^4$ and upon which a nut $T^2$ is mounted and forming means for holding the said member $T^3$ in different vertical positions within the slot $G^4$, according as it may be desired to set the apparatus to receive a different number of coins within the chute T, which is held to the under surface of the casing by means of the bracket member T⁴, said chute being in registration with the slot in the lower portion of the hopper member D.

The chute T has a slot T⁶ formed in one wall thereof in which the laterally projecting portion of the member T³ is guided, as will be noted upon reference to Fig. 5 of the drawings. A coiled spring Z is connected at one end to a pin Z′ upon the under surface of the casing and its other end to the lug Z², projecting from the shank portion K⁴ of a flanged guide plate K⁵, fastened to the under surface of the slide K, the purpose of which spring is to normally return the slide K, after having been moved forward through the medium of the push rod, and with it the slide E′ will return to its normal position.

Figure 1:
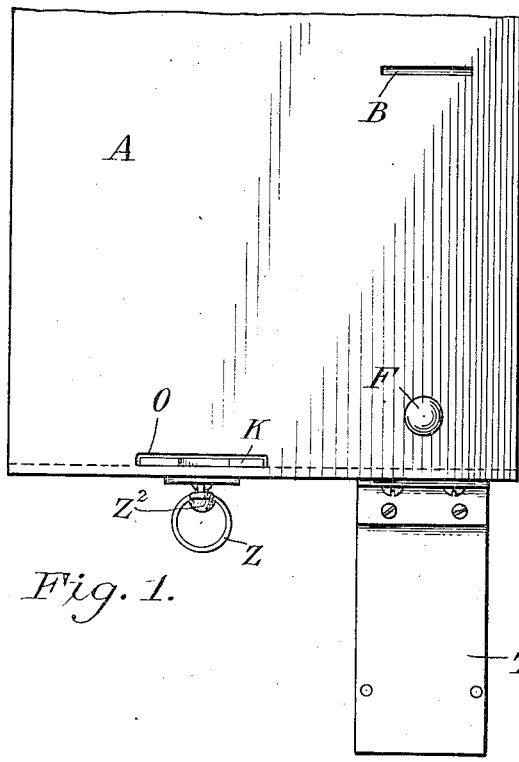
Figure 1 is a front elevation of the casing with check and coin slots therein.
Figure 4:
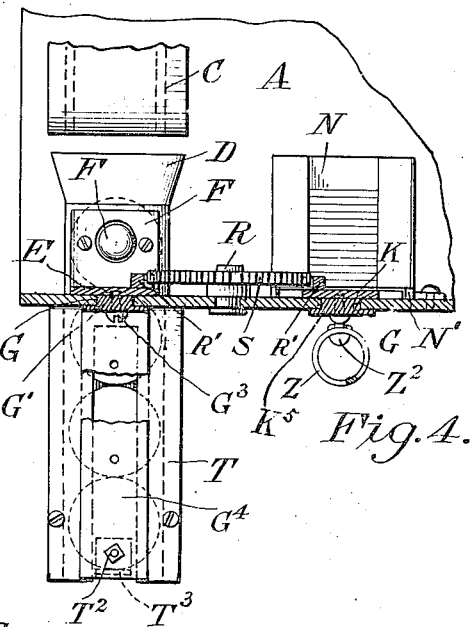
Fig. 4 is a sectional view on line 4—4 of Fig. 2.

In operation, piles of checks of similar denominations are placed within the two stacks M and N, and when it is desired to dispense simultaneously a check from the bottom of each pile, the operator drops in the required number of coins into the slot B and which coins will pass through the chute C into the hopper D and thence into the chute T, the first coin introduced falling by gravity into the adjustable L-shaped member T³, it being noted that the said member will be adjusted to regulate the number of coins which may be held within the chute T. In Fig. 4 of the drawings, the member T³ is adjusted at its lowest limit which will require four coins, superimposed one upon the other, indicated in dotted lines, to permit the apparatus to be operated when the rod F is pushed into the casing. When the rod F is pushed in, the inner end thereof contacts with the uppermost of the series of coins, pushing the same against the wall of the apertured portion of the hopper E, to which the slide E′ is fastened, and the latter will be moved with the hopper, causing the gear wheel S to rotate, which in turn will throw the slide K in the opposite direction.

Figure 2:
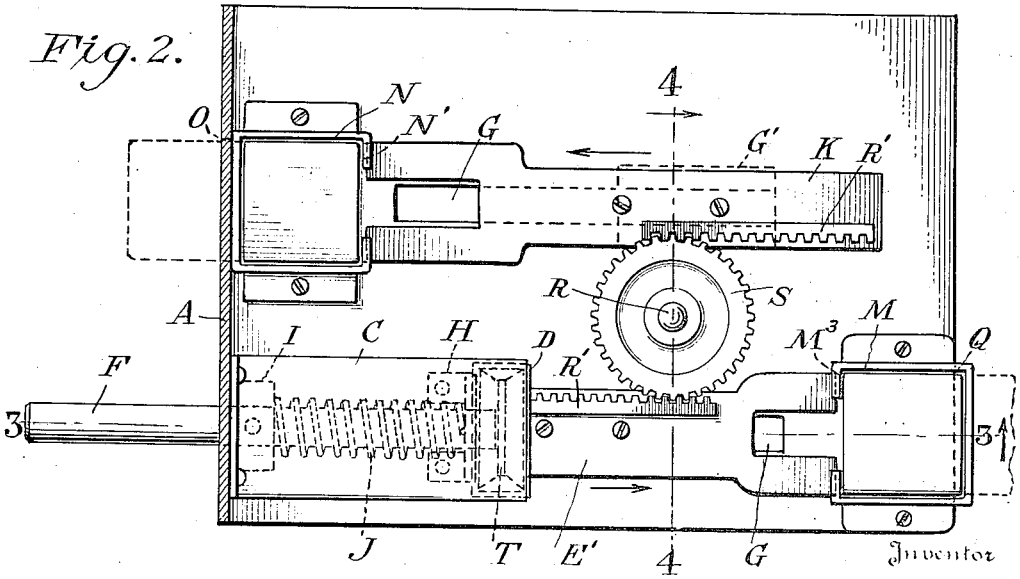
Fig. 2 is a top plan view of the mechanism.

As the slide E′ moves forward, it will push the check at the bottom of the pile in the stack M through the recess Q, shown in Fig. 3 of the drawings, and will deliver the same to the chef. The slide K, moving in the opposite direction, will push out the bottom check in the stack N, as shown in dotted lines in Figs. 2 and 3 of the drawings, and which is to be retained by the prospective purchaser. As the slide E′ is pushed forward by the rod F, the downwardly projecting portion G⁶ of the plate G′, which is attached thereto, and which projection carries the L-shaped member T³, will withdraw from underneath the coins permitting the latter, with the exception of the one which is being pushed forward by the rod F, to fall from the chute T.

When the pressure is released from the rod F, the spring J will return the latter to its normal position and the slides will be returned to their normal starting positions through the medium of the spring Z. When the coin in front of the rod is pushed back by the hopper in which it is mounted to the starting position of the latter, the coin will fall down into the chute T and be caught by the member T³.

By my double-check apparatus for use in connection with a new system of food service, it will be noted that the prospective purchaser may select the article to be ordered, and by dropping in the required number of coins, two identical checks will be delivered, one to the chef and the other to the purchaser and when the order is filled notice thereof may be given to the purchaser by any suitable annunciator mechanism, after which the check held by the purchaser may be utilized for releasing a door of a receptacle, in which latter the order from the chef has been placed.

What I claim to be new is:—

1. A double check system for food delivery service comprising a frame having a plurality of stacks, slides movable in opposite directions through said stacks for delivering simultaneously a check from each stack, gear mechanism intermediate the slides, a spring presser push rod adapted to coöperate with a coin for causing one of the slides to be actuated.

2. A double check system for food delivery service comprising a frame with a plurality of stacks adapted to contain duplicate checks, and having slots formed in the opposite walls thereof at the lower ends, slides movable in opposite directions through said slots, and gear mechanism intermediate and adapted to actuate the slides, a spring pressed push rod adapted to coöperate with a coin to cause the slides to move simultaneously in opposite directions.

3. A double check system for food delivery service comprising a frame with a plurality of stacks adapted to contain duplicate checks, and having slots formed in the opposite walls thereof at the lower ends, slides movable in opposite directions through said slots, and having rack teeth upon their adjacent edges, a gear wheel journaled between the slides and in mesh with the teeth thereon, and a spring pressed push rod adapted to coöperate with a coin for causing the slides to be moved simultaneously in opposite directions.

4. A double check system for food delivery service comprising a frame with a plurality of stacks adapted to contain duplicate checks, and having slots formed in the opposite walls thereof at the lower ends, slides movable in opposite directions through said slots, and having rack teeth upon their adjacent edges, a gear wheel journaled between the slides and in mesh with the teeth thereon, a hopper having registering openings in the opposite walls thereof, a spring pressed push rod mounted in registration with said openings, a plate secured to one of said slides and having an upturned portion with an opening therein and to which said hopper is fastened, a coin chute normally in registration with the hopper, and means movable with the plate and adapted to support a coin in said chute.

5. A double check system for food delivery service comprising a frame with a plurality of stacks adapted to contain duplicate checks, and having slots formed in the opposite walls thereof at the lower ends, slides movable in opposite directions through said slots, and having rack teeth upon their adjacent edges, a gear wheel journaled between the slides and in mesh with the teeth thereon, a hopper having registering openings in the opposite walls thereof, a spring pressed push rod mounted in registration with said openings, a plate secured to one of said slides and having an upturned portion with an opening therein and to which said hopper is fastened, a stationary chute normally in registration with said hopper, and having a longitudinal slot in one wall thereof, an adjustable member movable with the plate and adapted to engage said slot in the coin chute.

6. A double-check apparatus for food delivery service, comprising a casing with a plurality of stacks therein, slides movable through the lower portions of said stacks and designed to deliver simultaneously the lowermost check in each stack, rack teeth upon the slides, a stationary rotatable pinion wheel in mesh with the rack teeth upon the slides, a spring pressed push rod, adapted to coöperate with a coin for causing one of the slides to be moved.

In testimony whereof I hereunto affix my signature in presence of two witnesses.

EDWIN D. PRATT.

Witnesses:
S. WILLARD SMITH,
KATHERINE B. STEVE.